June 4, 1957 W. E. CANFIELD 2,794,526
CLUTCH DEVICE
Filed Aug. 6, 1953 4 Sheets-Sheet 1

INVENTOR.
WADE E. CANFIELD
BY
ATTY.

June 4, 1957  W. E. CANFIELD  2,794,526
CLUTCH DEVICE
Filed Aug. 6, 1953  4 Sheets-Sheet 2

INVENTOR.
WADE E. CANFIELD
BY
ATTY.

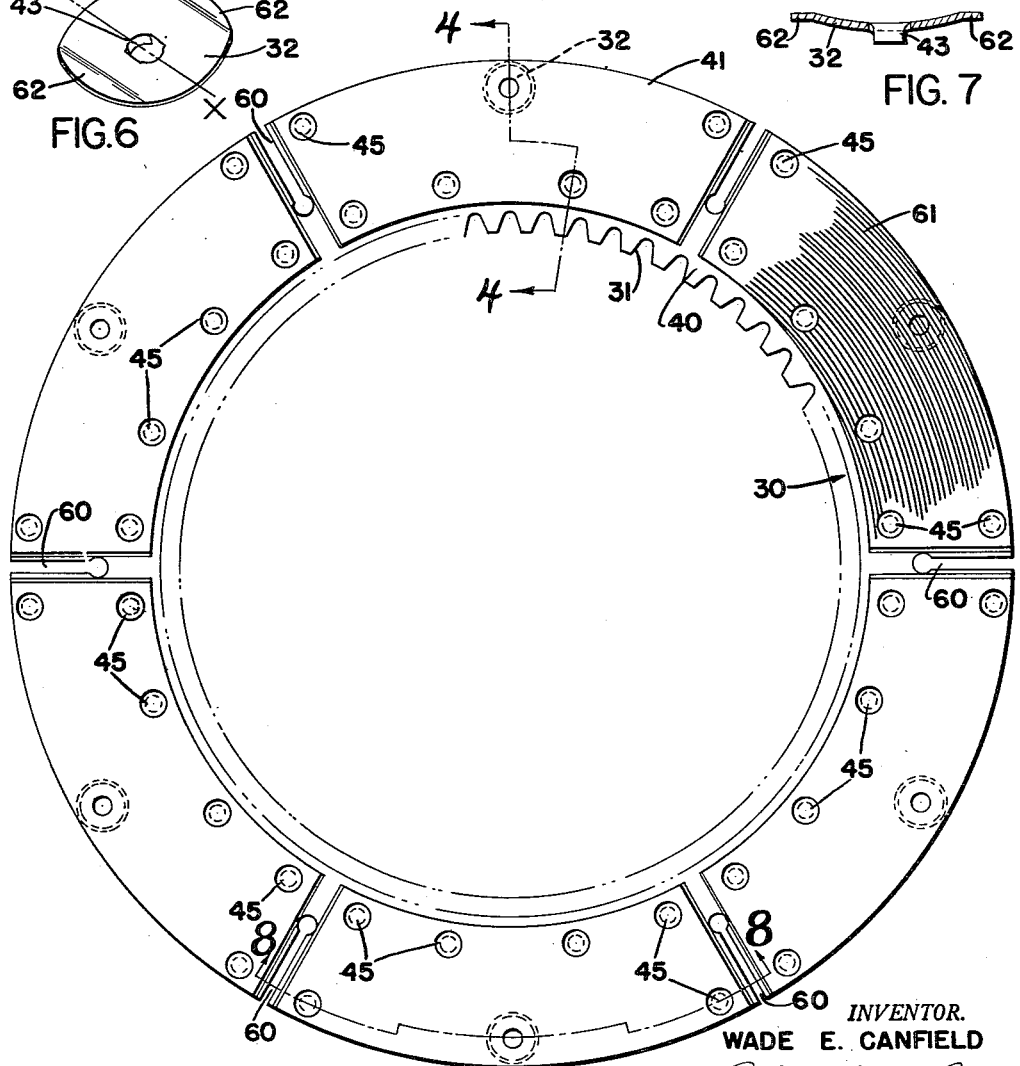

June 4, 1957   W. E. CANFIELD   2,794,526
CLUTCH DEVICE
Filed Aug. 6, 1953   4 Sheets-Sheet 4
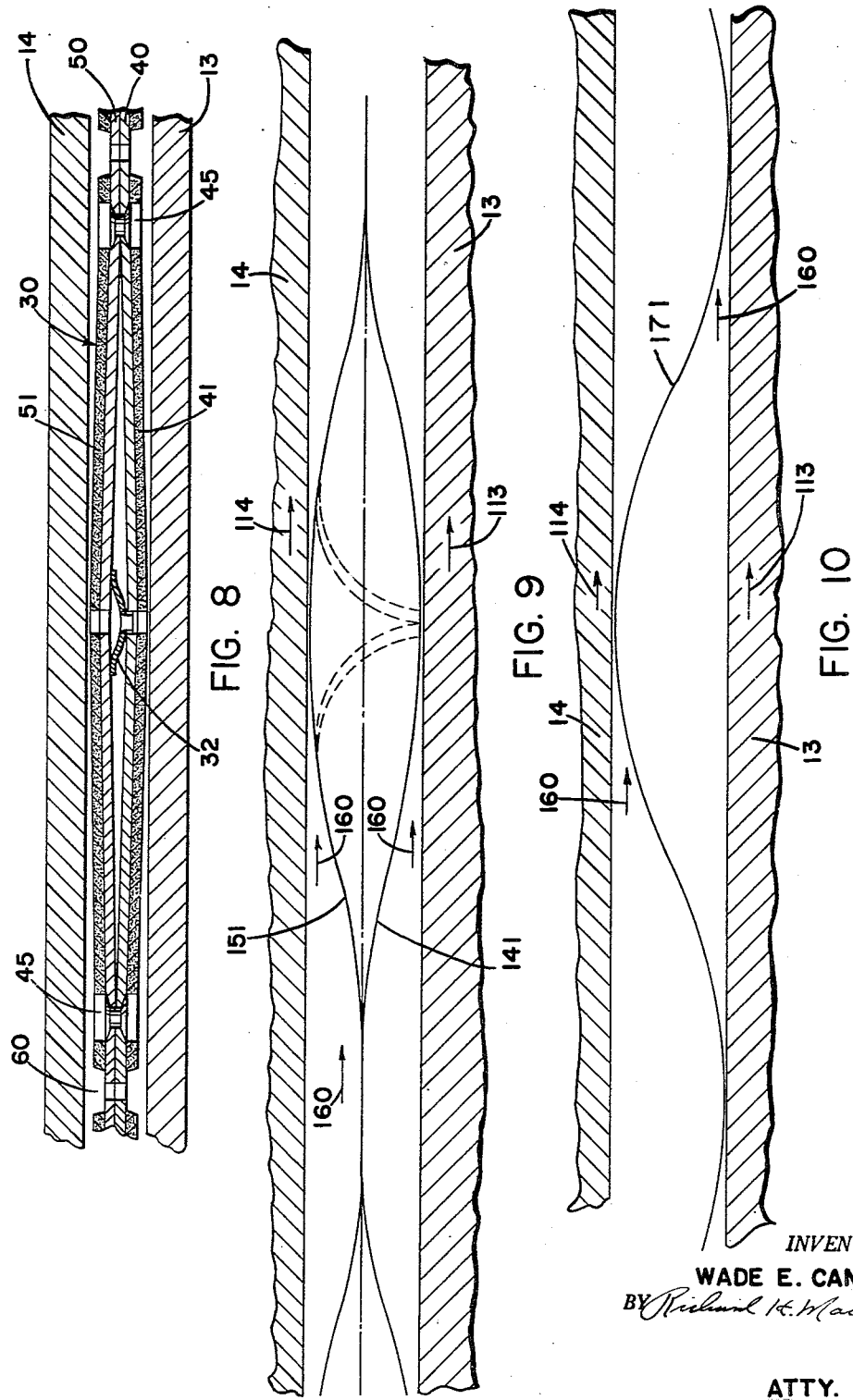
INVENTOR.
WADE E. CANFIELD
ATTY.

United States Patent Office 2,794,526
Patented June 4, 1957

2,794,526
CLUTCH DEVICE

Wade E. Canfield, Rocky River, Ohio, assignor to The S. K. Wellman Company, Cleveland, Ohio, a corporation of Ohio Application August 6, 1953, Serial No. 372,653

1 Claim. (Cl. 192—69)

This invention relates to clutches, brakes and other friction devices, and has particular significance in connection with devices of the type using a flexible disc member disposed between a pair of cooperating pressure plates adapted to clamp substantial areas of the disc therebetween with sufficient pressure to transmit power and with dependence upon resilience of a portion of the structure and cooperating internal spring means to permit breakaway by separating major areas of the mating surfaces although the surfaces remain in contact at small areas adjacent the springs. The latter condition may be called disengagement since the remaining areas of contact are sufficiently small (e. g., with respect to the load) that slippage will occur.

Many friction devices may be, and are herein, referred to somewhat generically by using the word "clutch." For example, a brake is a clutch with one of its principal members held stationary. Heretofore, there has been a problem in connection with the design of clutches which depend upon spring pressure for effecting disengagement and where it is desirable not to use any spring device which will add to the weight of spinning parts of the assembly. It has been known to have clutches which depend for disengagement upon internal spring action which relieves large contact areas and presses together only small surfaces so that slippage can occur. Examples of such arrangements are furnished by: (1) Clutches comprising an assembly of pressure plates and one or more intervening clutch discs with the latter having peripherally spaced small buttons each urged outward against one of the pressure plates by a small helical spring contained interiorally of the clutch disc; (2) clutches comprising an assembly of pressure plates and clutch discs with the latter comprising friction surfaces secured to a backing having partially cut out tabs which due to their own resilience and deformation press against the pressure plates to cause disengagement of major portions of the mating surfaces when pressure on the pressure plates is released; and (3) clutches having corrugated or waved spring discs adapted to deform themselves and/or mating members to cause disengagement of major areas when clutch engaging pressure is released.

Such prior art arrangements have had serious disadvantage due to the expense involved in providing such means and also due to unbalanced forces and misalignment and due to tendency to score pressure plate surfaces by the projecting buttons, or tabs, or whatever. Further, any such tabs will fatigue quickly because the steel usually has a low carbon content and cannot be heat treated once the friction facings are in place.

It is an object of the present invention to provide simple and inexpensive means for overcoming the above-mentioned difficulties.

Another object of the invention is to provide an improved type clutch characterized by low cost of manufacture and maintenance.

A further object is to provide an improved type clutch characterized by positive and rapid disengagement of principal portions of major mating surfaces when disengagement is called for, and without any tendency to score or abnormally wear the pressure plates during disengagement.

A still further object is to provide a clutch device of the type adapted to operate in oil and when running therein characterized by a balance of forces which permits smooth running without "wobble" of the various parts when in the disengaged position.

Broadly, in accordance with one aspect of the invention, I meet these and other objects by providing a clutch having cooperating pressure plates and at least one intervening clutch disc with the latter containing a recess. Fitted in the recess is a deformed washer of resilient material and the recess is just big enough to accommodate the washer flattened out by the pressure applied for clutch engagement. In accordance with another aspect, the clutch plate comprises two half sections each with a sintered powdered friction material surface on the outboard side and a carrier plate on the inboard side. One of the carrier plates has at least one spring recess on its inboard side and containing a deformed washer type spring and the two friction surfaces and the intervening carrier plates are flexible and are all held together by rivets so that the dished washer will deform carrier plates and friction surfaces (intermediate the rivets) into a waved configuration and the washer will have no tendency to become misplaced in the overall assembly. When operating in oil such a structure affords a balance of forces (as will hereinafter be more fully explained) with consequent advantages due to less wear with the same service, less noise, less vibration and greater stability.

I am aware that dished washer type springs have previously been used in clutches, yet so far as I know they have always been provided as a means for furnishing a cushioning action upon engagement and have never been used as means for effecting disengagement of major portions of mating members. As used in connection with the arrangement of the present invention, the dished washers may be very small, and they are preferable relatively few in number, so that very economical means are provided for meeting the objects of the invention, and there is thus provided a clutch of the type described characterized by minimal addition to the rotating inertia of the arrangement, by minimal tendency to score or wear adjacent surfaces during disengagement and by less wobble and vibration of the parts during disengagement.

Other objects and advantages will become apparent and the invention will be better understood from consideration of the following description taken in connection with the accompanying drawings, in which:

Fig. 3 is a front face view of one of the clutch disc assemblies which form a part of the device shown in Fig. 1;

Fig. 4 is a view in section and enlarged and taken along line 4—4 of Fig. 3, but showing the disc assembly in the compressed (i. e., "engaged") position;

Fig. 5 is a view taken like Fig. 4 but showing only a portion of one of the two half sections making up the completed clutch disc;

Fig. 6 is a view in perspective of one of the spring washers shown in Figs. 1–5;

Fig. 7 is a cross sectional view of the spring washer shown in Fig. 6;

Fig. 8 is a developed view taken as along the arc 8—8 (of Fig. 3) to show a circumferential section of the device when in the disengaged position;

Fig. 9 is a schematic representation of the balanced forces developed when the parts as shown in Fig. 8 operate in a fluid such as oil; and Fig. 10 is a schematic representation of the unbalanced forces developed when a typical prior art arrangement operates in a fluid such as oil.

Figure 1:
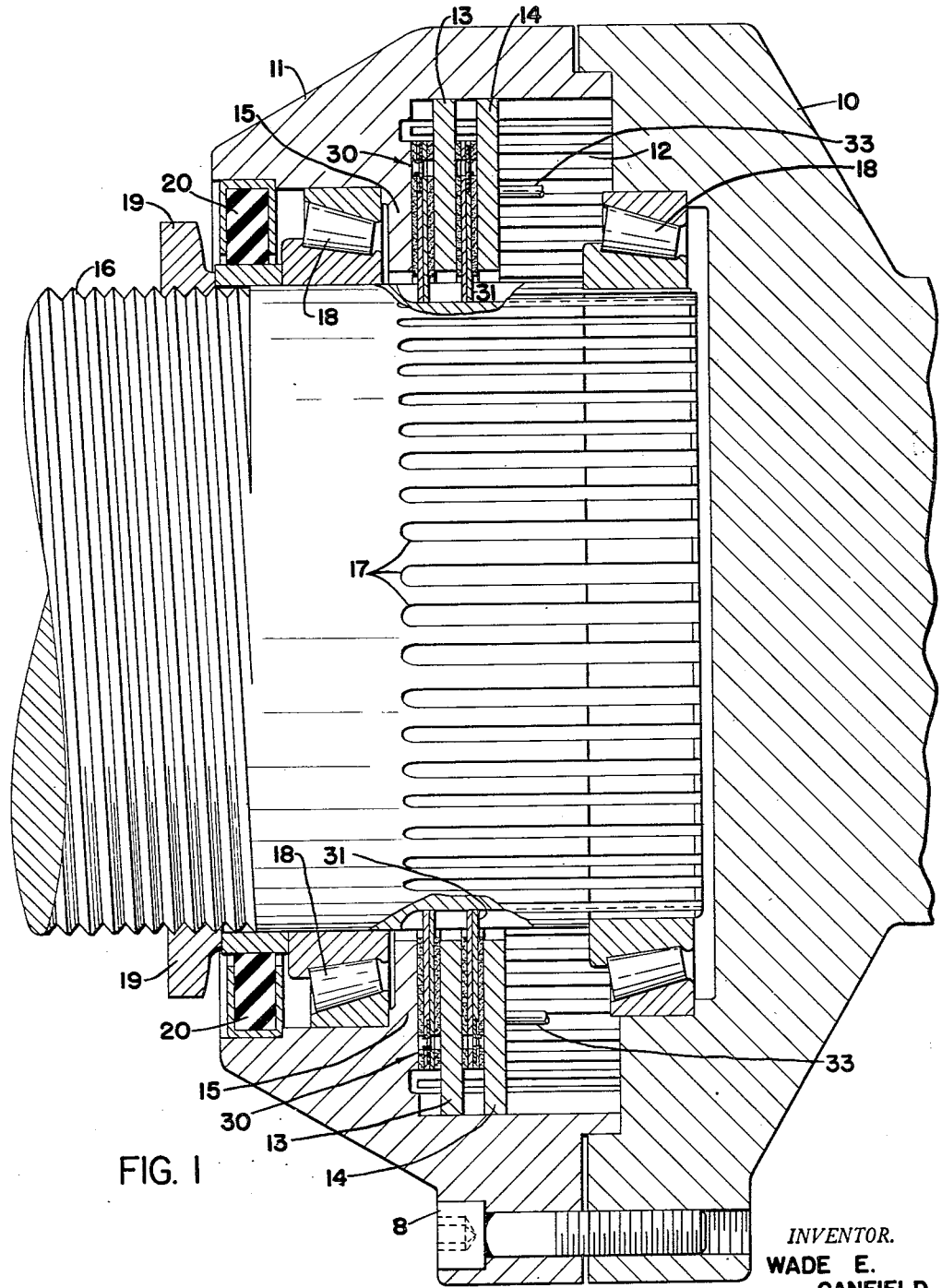
Fig. 1 is a cross sectional view of a clutch device constructed in accordance with the invention and showing the device in "engaged" position.
Figure 2:
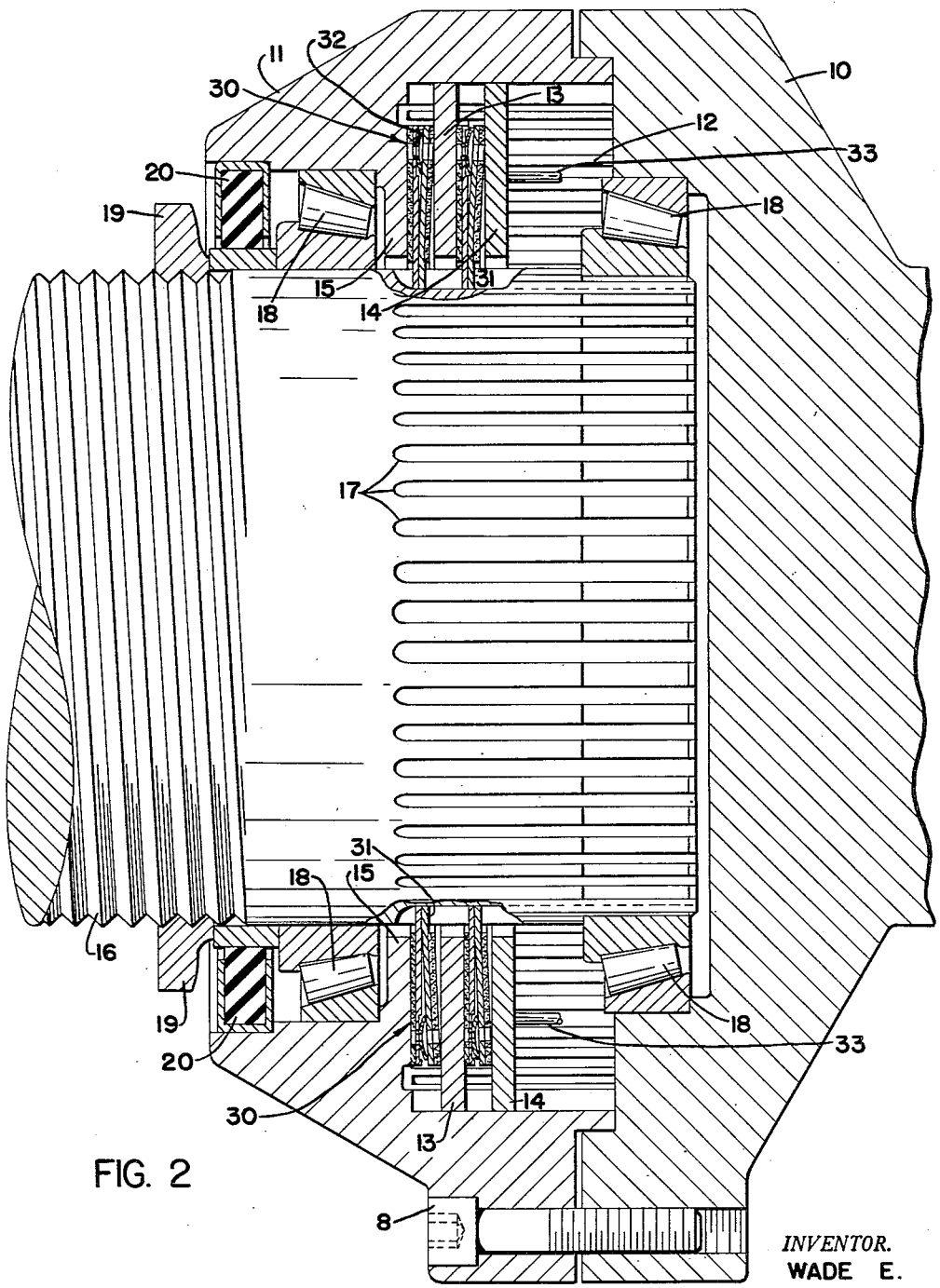
Fig. 2 is a view similar to Fig. 1 but to an exaggerated scale ratio to show the device in disengaged position.

Referring first to Figs. 1 and 2, I have shown a clutch device having a driving flange 10 which may be assumed to be engine driven and which drives a member 11 having an internally splined portion 12 for driving axially slidable pressure plates 13 and 14. An axially stationary end portion 15 of member 11 in effect serves as a third pressure plate. The device has a driven output shaft 16 provided with external splines 17. For purposes of later explanation of operation, it will be assumed that this output shaft is always connected to a load (not shown) such as would normally be provided by caterpillar tracks of a vehicle.

Outer flange members 10 and 11 are held together, as by bolts 8, and the inner driven shaft 16 is journalled in these members, as shown, by anti-friction bearing assemblies 18, and held in place axially by threaded engagement with a nut 19.

The flange members 10 and 11 form an enclosure about the splined portion of the shaft 16, and this enclosure is sealed by an oil ring 20 and the enclosure is filled with oil serving as a lubricant for the bearings and as a coolant for the clutch plates 13—14 and for clutch disc assemblies indicated generally at 30. With the construction of the invention the same oil also serves as a balancing medium to prevent wobble as will hereafter be more fully explained in connection with consideration of Fig. 8. The clutch disc assemblies 30 are interspersed between the pressure plates and on their inner diameters have teeth 31 (Fig. 3) which mate with splines 17 provided on the output shaft 16 (Fig. 1).

In accordance with the illustrated embodiment of the present invention, each clutch disc assembly 30 contains a plurality of circumferentially spaced deformed washers 32 of spring material and which in Figs. 1 and 4 are shown flat (that is compressed) and in Figs. 2, 6, 7 and 8 are shown sprung out to their deformed position. The "engaged" position of Fig. 1 is effected by fluid pressure or other means which may be quite conventional and, hence, is indicated only diagrammatically by the push rods 33 in the drawing.

In accordance with one aspect of the invention, and as may be most clear from consideration of Figs. 3–6, each clutch disc assembly 30 comprises two half sections each having a flexible metallic carrier plate 40, 50 (which may be of steel) and bonded thereto a friction facing 41, 51, respectively, of sintered powdered metallic or sintered powdered metallic and non-metallic material. Because the sintered material is rather frangible, it is conventional to use such a backing member or carrier plate of steel with the combined metallic and nonmetallic mixture compressed and heated to affect sintering and simultaneous bonding to the carrier plate. Such friction facings of powdered material sintered and bonded to a metallic backing member are well known to the art and have numerous advantages over fiber facings, the sintered facings being less susceptible to changes in temperature and atmospheric conditions and less affected by oil, grease and foreign matter and showing less wear with the same use. U. S. Patent 2,178,527—Wellman and Reissue Patent 22,282—Swartz disclose examples of such sintered and bonded products.

It has been found that such friction facings comprising sintered powdered metallic materials can be used in applications which for operation depend upon flexing of the facing. Thus, when the facing is relatively thin and the displacement due to flexing is relatively small with respect to the distance between nearest points of opposite flexing, such sintered materials can be flexed the required amount without cracks or spalls and with the application of no more force than that exerted by a thin deformed washer of spring material such as chrome vanadium spring steel, or high carbon spring steel, .015" thick, deformed to a 1" radius and ¾" diameter overall.

In the illustrated embodiment the clutch disc half 40 differs from half 50 in that the carrier plate 41 of the former is provided with recesses 42 for containing the spring washers 32 and which lie therein so as to be adjacent to each carrier plate, that is operative against the inner surface of the recess of plate 41 and against the adjacent unrecessed surface of plate 51. Each washer 32 is provided with a split hub portion 43 designed to provide a snap fit in holes 44 provided through all of the facings and carrier plates to provide a measure of standardization and also in order that the springs may be seated with the hubs facing either way.

The plate and facing of the two half sections (with the intervening spring washers 32 in place) are riveted together to be firmly held in permanent engagement as by rivets 45 extending through rivet holes 46 at locations which are substantially spaced from the locations of springs 32. As shown in the drawing the clutch disc assemblies are riveted together on at least three sides of each spring and the distance from each spring to the nearest rivet is substantially greater than the distance of deflection caused by the springs when pressure applying force is released from the clutch plates. By way of example, good results have been obtained using a friction facing having an O. D. of 17½" and I. D. of 12½", a thickness of .078", a spring washer .015" thick and arranged to deflect the facings and carrier plates so that the thickness of the total disc assembly is not more than .025" greater when free than when compressed, with the rivets spaced radially away from the springs, as shown, so that despite the small radial width of the facing $$\left(\frac{17\frac{1}{2}-12\frac{1}{2}}{2}=2\frac{1}{2}''\right)$$

the nearest rivets are spaced at least 1½" away from the nearest spring.

If desired, the clutch disc carrier plates 40, 50 may be slotted as shown at 60 to provide greater peripheral flexibility in both axial and circumferential directions, and adjacent these slots the friction facings may be omitted, as shown, each facing 41, 51 then being provided as merely a plurality of arcuate segments (see Fig. 3).

Preferably the heads of the rivets 45 are countersunk below, or at least do not extend beyond, the outer surfaces of the friction facings in order that these members will not tend to score the pressure plates.

As previously stated the device is constructed so that the clutch discs run wholly or partially immersed in oil, one purpose of this being to facilitate cooling of the members. In order that the friction characteristics of the material will not thereby be prevented from exerting their full influence at the first moment of contact (or for an interval of time thereafter until the oil film separating the facing from the brake drum has been broken down or removed) I provide on the outer face of each friction surface (41, 51) spiral grooves 61 spiralling outward so that for a predetermined direction of normal rotation these grooves will act as pump out grooves pumping out oil between the mating surfaces of clutch discs and pressure plates and thus preventing the well known effect where the presence of an oil film seems to prevent any clutching action at all until the clutch suddenly takes hold so violently as to endanger the device. It is to be noted that with the arrangement assumed, as soon as the device is declutched (by removal of pressure application through rods 33) the clutch discs will come to rest, the pump grooves will be substantially inoperative, and the oil will return between clutch discs and pressure plates and serve to recool these members.

Referring to Figs. 6 and 7, it is to be understood that the dished spring is here shown in its uncompressed position.

The deflection is preferably only in a single plane, i. e., with the washer bent only around a single axis (x—x in Fig. 6), and I have found it preferable to flatten out portions 62 of the outer periphery so that these portions, which are opposite the axis x—x lie in the plane of this axis, and allow for sliding upon, rather than digging into, adjacent metallic surfaces when installed.

As already mentioned, one reason for running the clutch device immersed in oil is to secure balanced forces. So far as I know, this result is possible only in arrangements according to the invention. This may be more clear by reference to Figs. 8–10.

Fig. 8 is a developed view taken along the arc 8—8 of Fig. 3 and showing the disengaged position where both friction surfaces (41—51) and both backing plates (40—50) are arced outwards toward the respective pressure plates (13 or 14) adjacent the spring 32 while restrained (between springs) by the rivets 45. As previously intimated, for the disengaged position the engine driven members (13, 14) continue to rotate while the load driving members (40, 41, 50, 51) come to rest. In Fig. 9 the parts are diagrammatically shown to an expanded vertical scale, the clutch disc assembly halves being represented by sinuous lines 141 and 151, respectively, and the rotative motion of pressure plates 13 and 14 being shown by the directional arrows 113 and 114, respectively. These rotating parts will carry some of the oil with them and at least with respect to the relatively stationary clutch disc halves (lines 141, 151) this oil will take the direction of arrows 160 wedging in between clutch disc facings (141, 151) and the adjacent pressure plates (13 and 14, respectively) not only reducing friction during disengagement but providing balanced forces so that there will be less "slop" of backing plates upon their spline teeth, less "slop" of pressure plates within their spline teeth, and consequently less wobble, wear and vibration for all the parts.

As may be most clear from consideration of Fig. 10 which is a diagrammatic representation of the condition for most prior art clutches of the type depending upon internal spring means for disengagement, where a single ordinary corrugated (i. e., waved washer), or where spring biased buttons or tabs are used to wave a flat washer, a single sinuous line 171 may be thought of as resulting. If again 13 and 14 represent the pressure plates, arrows 113 and 114 represent their motion and arrows 160 represent motion of the oil, it will be seen that with this (prior art) arrangement the clutch disc will tend to twist because of unequal forces. This causes uneven wear, vibration and noise.

On the other hand, the arrangement of the invention using two half disc assemblies (and spring means in between) provides forces which are balanced and exactly opposite in location so that there is no tendency for any of the parts to "cock" upon its axis.

In operation, the arrangement described provides a faster, cleaner break-away than any arrangements heretofore known to me, and there is thus provided a device of the class described capable of meeting the objects above set forth.

While I have illustrated and described a particular embodiment of the invention, various modifications will obviously occur to those skilled in the art and I desire it to be understood that the invention is not to be limited except by the scope of the claim appearing hereafter and which is intended to include all reasonable equivalents.

I claim:

In a clutch mechanism, an annular hollow driving flange having an internally splined hollow portion arranged to rotate therewith, a plurality of annular pressure plates having teeth in their outer peripheries and arranged within said splined portion to be rotatably driven thereby while axially slideable with respect thereto, an axially stationary portion associated with the splined hollow portion and adapted to act as an additional pressure plate, an output shaft provided with external splines interiorally of the splined hollow portion and protruding from the splined hollow portion while co-axial therewith and journaled therein and in said hollow flange and making a clearance with the inner peripheries of the pressure plates to be separately rotatable with respect thereto, a plurality of at least two clutch disc assemblies each intervening between a different pair of pressure plates and each comprising two half sections each having an annular solid metal carrier plate on the inboard side of the assembly with the inner periphery of each carrier plate splined to engage the splines of the output shaft to drive the shaft while slideable with respect thereto, means for selectively applying pressure to press the pressure plates and intervening clutch disc assemblies together, each of the carrier plates being divided into circumferentially spaced sectors by radially extending slots extending inward from the plate outer periphery more than halfway to the inner periphery splines to provide peripheral flexibility, each of the carrier plates having bonded thereto a plurality of arcuate segments of sintered predominantly metallic friction facing arranged between said slots on the outboard side of the respective carrier plate and extending from the plate outer periphery inwardly to a point adjacent the inner periphery splines, each of the clutch disc assemblies having rivets adjacent the slots at the outer periphery and adjacent the splines at the inner periphery for holding the half sections together, a plurality of deformed washer springs each adapted when uncompressed to deflect only around an axis in a single plane and each having diametrically opposite portions of its outer periphery flattened out in the plane of said axis to permit sliding without digging, said plurality of deformed washer springs located one midway between each pair of carrier plate slots and contained in a recess in one of the plates and for biasing the half sections apart at the middle of each arcuate segment of friction facing midway between slots to deform carrier plates and friction surfaces into a waved configuration when pressure is released from the pressure plates, the rivets being countersunk below the facing outer surfaces and spaced from the deformed washer springs a distance substantially greater than the amount of deflection caused by said springs, means including an oil ring arranged around the shaft and for retaining oil in the enclosure formed by the hollow driving flange and internally splined hollow portion, oil in said enclosure and about and between the pressure plates and clutch disc assemblies, and means including spiral grooves in the sintered predominantly metallic friction facings and acting as oil pump out grooves for cooling the facings, acting as a lubricant except during engagement, and providing balanced forces to prevent noise, vibration, wobble or cocking of pressure plates or clutch disc assemblies during engagement or disengagement.

References Cited in the file of this patent

UNITED STATES PATENTS

| | | |
|---|---|---|
| 2,207,961 | Wellman | July 16, 1940 |
| 2,249,281 | Wellman | July 15, 1941 |
| 2,380,680 | Thompson | July 31, 1945 |
| 2,419,253 | Cahill | Apr. 22, 1947 |

FOREIGN PATENTS

| | | |
|---|---|---|
| 474,912 | Canada | July 3, 1951 |